(12) United States Patent
Artamo et al.

(10) Patent No.: US 10,035,077 B2
(45) Date of Patent: Jul. 31, 2018

(54) FALLING FILM EVAPORATOR

(75) Inventors: Arvi Artamo, Espoo (FI); Pentti Juhola, Espoo (FI)

(73) Assignee: RINHEAT OY, Espoo (FI)

( * ) Notice: Subject to any disclaimer, the term of this patent is extended or adjusted under 35 U.S.C. 154(b) by 676 days.

(21) Appl. No.: 13/822,924

(22) PCT Filed: Sep. 28, 2011

(86) PCT No.: PCT/FI2011/050838
§ 371 (c)(1),
(2), (4) Date: Apr. 9, 2013

(87) PCT Pub. No.: WO2012/042113
PCT Pub. Date: Apr. 5, 2012

(65) Prior Publication Data
US 2013/0206343 A1    Aug. 15, 2013

(30) Foreign Application Priority Data
Sep. 28, 2010 (EP) .................... 10397515

(51) Int. Cl.
*B01D 1/06* (2006.01)
*F28B 1/02* (2006.01)
*B01D 1/30* (2006.01)

(52) U.S. Cl.
CPC ............ *B01D 1/065* (2013.01); *B01D 1/305* (2013.01); *B01D 1/06* (2013.01); *F28B 1/02* (2013.01)

(58) Field of Classification Search
CPC . B01D 1/065; B01D 1/08; B01D 1/10; B01D 1/12; B01D 5/0012; B01D 1/06;
(Continued)

(56) References Cited

U.S. PATENT DOCUMENTS 1,265,863 A * 5/1918 Abbott ................ B01D 1/10
159/14
1,770,320 A * 7/1930 Morterud ............... F28D 7/12
159/28.3
(Continued)

FOREIGN PATENT DOCUMENTS

FI          862703 A     12/1987

OTHER PUBLICATIONS

International Search Report, dated Feb. 1, 2012, from corresponding PCT application.
(Continued)

*Primary Examiner* — Jonathan Miller
*Assistant Examiner* — Jonathan Luke Pilcher
(74) *Attorney, Agent, or Firm* — Young & Thompson

(57) ABSTRACT

A falling film evaporator, includes an outer shell formed by a cylindrical shell and convex ends, at least one tube bundle formed of vertical tubes arranged inside the outer shell, whereby a heat-releasing, condensable vapor can be fed into the vertical tubes from below upwards, and a heat-receiving, vaporizable liquid can be fed to the upper end of the tube bundle to flow downwards along the outer surface of the vertical tubes as a thin liquid layer, whereby an element for discharging non-condensable gases contained in the heat-releasing vapor has been arranged in the tube bundle. The evaporator includes two or more tube bundles each being provided with a tube plate of its own, whereby the vertical tubes of each tube bundle are at their lower ends attached to the tube plate of the corresponding tube bundle and at their upper ends to collecting manifolds of the corresponding tube bundle.

15 Claims, 1 Drawing Sheet

(58) Field of Classification Search
CPC ..... F28D 3/00; F28D 3/02; F28D 3/04; F28D 5/02; F28B 2001/065; F28B 1/02
USPC ............................ 159/13.3, 13.1, 13.2, 13.4
See application file for complete search history.

(56) References Cited

U.S. PATENT DOCUMENTS

| | | | | |
|---|---|---|---|---|
| 1,883,378 | A * | 10/1932 | Kermer | B01D 1/08 |
| | | | | 159/23 |
| 2,519,618 | A * | 8/1950 | Wilson | B01D 1/10 |
| | | | | 159/13.4 |
| 2,695,869 | A * | 11/1954 | Sondermann | B01D 1/12 |
| | | | | 159/27.3 |
| 2,750,999 | A * | 6/1956 | De Vries | 159/18 |
| 3,332,469 | A * | 7/1967 | Rosenblad | B01D 1/22 |
| | | | | 159/13.3 |
| 3,468,293 | A * | 9/1969 | Bergstrom | B01D 1/12 |
| | | | | 122/34 |
| 4,216,002 | A | 8/1980 | Rosenblad | |
| 4,520,866 | A | 6/1985 | Nakajima et al. | |
| 4,810,327 | A | 3/1989 | Norrmen | |
| 4,925,526 | A * | 5/1990 | Havukainen | B01D 1/065 |
| | | | | 159/13.3 |
| 5,423,952 | A | 6/1995 | Stout | |
| 5,624,531 | A | 4/1997 | Knuutila et al. | |
| 2004/0245084 | A1 | 12/2004 | Bethge | |

OTHER PUBLICATIONS

European Search Report, dated Mar. 15, 2011, from corresponding European application.

* cited by examiner

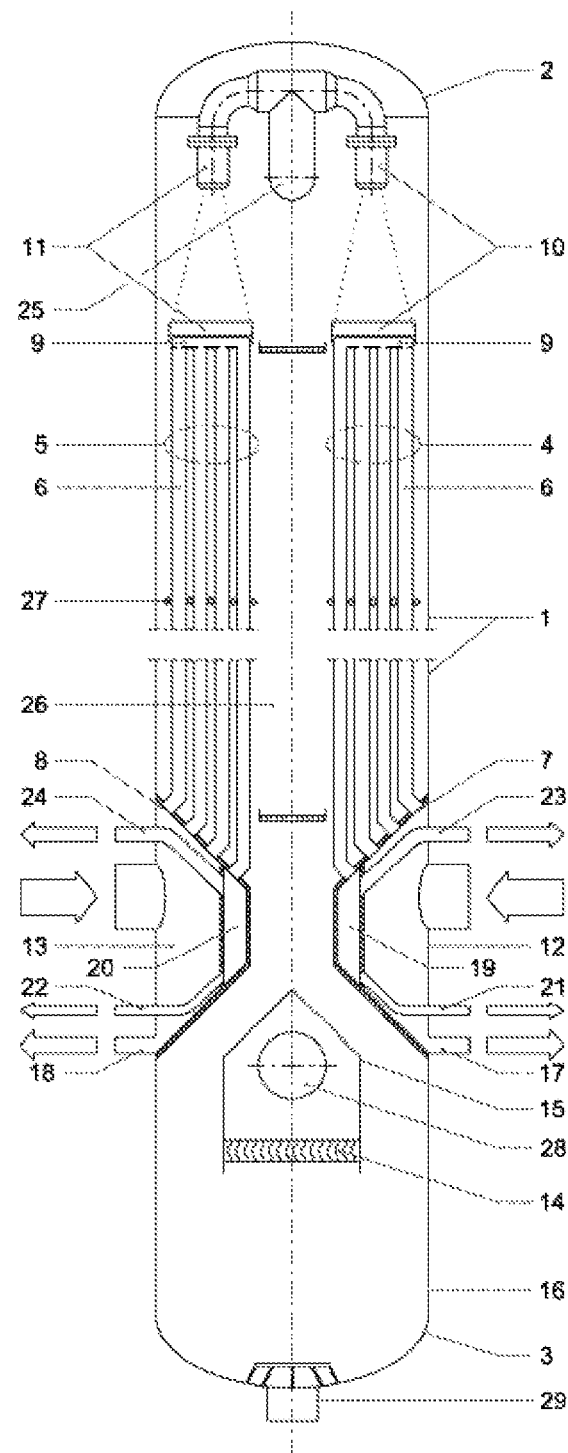

FALLING FILM EVAPORATOR

BACKGROUND OF THE INVENTION

Field of the Invention

The present invention relates to a falling film evaporator, comprising an outer shell formed by a cylindrical shell and convex ends, at least one tube bundle formed of vertical tubes arranged inside the outer shell, whereby a heat-releasing condensable vapour can be fed to the vertical tubes from below upwards, and whereby to the upper end of the tube bundle a heat-receiving, vaporizing liquid can be led to flow down the outer surface of the vertical tubes as a thin liquid layer, the tube bundle being provided with means for discharging uncondensed components contained in the heat-releasing vapour.

Description of the Related Art

From the Finnish patent No. 76699 an evaporator of the aforementioned kind is previously known. In said evaporator vertical tubes are at their lower end attached to a tube plate and closed at their upper end, whereby inside each vertical tube, another parallel tube is arranged which, in turn, is attached to another tube plate, whereby vapour fed to a vapour inlet chamber arranged between said two tube plates and which flows upwards inside the outer tubes falls down through these internal tubes to a space arranged below the other tube plate and flows from there further upwards through the internal tubes of those tubes positioned on the other side of a partition wall dividing the vapour inlet chamber, and through the outer tubes downwards to a space of the vapour inlet chamber separated by the partition wall, wherefrom the foul condensate is discharged through a discharging conduit arranged in the bottom and uncondensed vapour is discharged through a discharging conduit arranged in the upper part of the space. However, said patent does not disclose in which place the concentrated liquid ends up in and wherethrough it is discharged from the evaporator. This kind of construction makes an evaporator heavy, and thus this construction is suitable only for small-sized devices.

From U.S. Pat. No. 5,624,531 another evaporator operating on falling film principle is known. In said evaporator a tube bundle is formed of a plurality of parallel evaporating elements, each evaporating element being formed of vertical tubes arranged on the same level, whereby the upper ends of the tubes are connected to a common collecting pipe, and the lower ends to another common collecting pipe. All upper collecting pipes are connected to one common collecting chamber, and all lower collecting pipes are connected to another common collecting chamber. According to one embodiment, a condensable vapour is led to the lower collecting chamber, whereby the condensate generated in the vertical tubes is discharged from the bottom of said collecting chamber, and the vapour entering the upper collecting chamber is discharged from the evaporator. A liquid to be evaporated is led to the upper end of the tube bundle in the same manner as in the above-mentioned evaporator. The concentrated liquid flows down to the bottom of the evaporator, wherefrom it is discharged from the evaporator or is returned to the upper end of the tube bundle in order to be evaporated further, and the vapour evaporated from the liquid is discharged from the upper end of the evaporator through a droplet separator. The construction of this kind is not suitable in cases in which as a heat source a contaminating vapour flow containing non-condensable gases is used.

BRIEF SUMMARY OF THE INVENTION

The purpose of the present invention is to provide an evaporator which enables effective heat transfer and allows also the use of contaminating vapour flows containing uncondensable gases as a heat-releasing vapour.

This is achieved by an evaporator which is characterized in that the evaporator comprises two or more tube bundles each being provided with a tube plate of its own, whereby the vertical tubes of each tube bundle are at their lower ends attached to the tube plate of the corresponding tube bundle and at their upper ends to collecting manifolds of the corresponding tube bundle.

The inner surfaces of the vertical tubes of the evaporator according to the invention are substantially self-cleaning due to the condensate layer falling downwards. In addition, the vapour flowing upwards against the condensate flow purifies the condensate effectively by stripping. Instead, the outer surface of the vertical tubes of the tube bundle can be easily cleaned due to the construction of the tube bundle. The evaporator according to the invention can, both on the tube side and on the jacket side, be divided into compartments which can be coupled in parallel or in series in different manners. The evaporator enables also effective desuperheating, when a superheated vapour is used as a heat source.

In one embodiment the evaporator comprises two crescent shaped tube bundles, each been provided with its own tube plate, the tube bundles being arranged to form an empty space between them which is also usable for measures of maintenance.

An outlet for discharging the evaporated vapour is preferably arranged in connection with a vapour collecting chamber which is provided with a droplet separator and positioned at the lower part of the evaporator.

According to one preferred embodiment of the invention, the tube plate of each tube bundle is inclined with respect to the horizontal to allow the unvaporized part of the liquid flow to fall down along the inclined tube plate to a liquid space, from which it is discharged through an outlet arranged in the bottom. Preferably, in the lower end of the vertical tubes a bend has been formed to allow said tubes to end perpendicularly to the inclined tube plate.

Especially in connection with high evaporator constructions the vertical tubes of each tube bundle are supported by support structures at least at one point between the ends of the tube. Said support structures facilitate assembling of the evaporator and give support to the vertical tubes and the tube bundles during transport, preventing simultaneously detrimental vibration and breakage in use.

The vertical tubes of the tube bundle are conventionally made of metal but may in some cases be made of a thin plastic material which is especially advantageous from the view of cleaning.

When the device comprises several tube bundles, it is possible to lead to the tube bundles vapours of different quality and/or different pressure.

Individual tube bundles may also be divided into partial tube bundles to which different vapours can be led.

Underneath each tube plate, a vapour inlet chamber for the corresponding tube bundle is arranged, whereby the lower end of at least one vertical tube attached to one end of the collecting pipes is arranged to end in a separating space separated from the vapour inlet chamber.

At the upper end of those vertical tubes in which the vapour flows upwards, a throttling opening is arranged. Said throttling openings enable an even vapour flow to the vertical tubes and the discharge of the non-condensable gases from the vertical tubes.

Each tube bundle of the evaporator may have its own liquid circuit having different concentrations, whereby the liquid space of the evaporator is divided by partition walls into compartments to keep the different liquid circulations separated from each other.

The vapour space between the tube bundles may also be divided by a partition wall to allow arranging of two evaporation stages in the same evaporator.

BRIEF DESCRIPTION OF THE DRAWINGS

FIG. 1 illustrating a longitudinal section of one embodiment of an evaporator according to the invention.

DETAILED DESCRIPTION OF THE PREFERRED EMBODIMENTS

The outer shell of the evaporator shown in the FIGURE consists of a cylindrical jacket 1 and convex ends 2, 3.

In the shown embodiment, inside the cylindrical jacket two tube bundles 4, 5 have been arranged.

The vertical tubes 6 forming a heat transfer surface are attached at their lower ends to a tube plate 7 and 8, respectively, of the corresponding tube bundle 4 and 5, respectively. The tube plates 7, 8 are inclined, and the lower ends of the vertical tubes 6 have a bend corresponding to the inclination. The vertical tubes 6 are attached to the tube plates 7, 8 at a right angle (90°). At their upper ends the vertical tubes 6 are attached to collecting manifolds 9.

Above the tube bundle 4, 5, liquid distribution devices 10, 11 are arranged to feed a liquid to be vaporized onto said tube bundle. Underneath the tube plates 7, 8, vapour inlet chambers 12, 13 are arranged, whereby below these a vapour collecting chamber 15 provided with a droplet separator 14 is arranged. The lower part of the shell 1 and the lower end 3 form a pumping container 16 for the liquid to be evaporated.

In the shown evaporator the heat-releasing vapour is conducted through the vapour inlet chambers 12 and 13 to the vertical tubes 6 from below upwards.

It is possible to feed to both tube bundles 4, 5 same kind of vapour or vapours differing from each other both in quality and in pressure. An individual tube bundle may also be divided into partial tube bundles to which different vapours may be led.

The vapour which flows in the vertical tubes upwards condenses, and the condensate flows downwards against the vapour flow and further to the lower part of the vapour inlet chambers 12, 13, wherefrom it is discharged through connecting pieces 17, 18. The upper ends of the vertical tubes 6 in which the vapour flows upwards, are provided with throttling openings to ensure even vapour flow to the tubes 6 and discharge of the non-condensable gases from the tubes 6.

The uncondensed part of the vapour flows through the throttling openings to the collecting pipes 9 connecting the upper ends of the vertical tubes 6, wherefrom it is conducted to the outermost vertical tubes of the collecting pipes, where it and the generating condensate flow from above downwards.

The vertical tubes 6 in which the flow direction of the vapour is from below upwards, form a first tube pass of the tube bundle 4, 5, and the tubes in which the flow takes place from above downwards form a second tube pass. The second tube pass cools the vapour flow, whereby a part thereof condenses. The condensate and the part being still uncondensed are conducted down to a separating space 19, 20 wherefrom the condensate is discharged from the lower part of the space through outlets 21, 22, and the uncondensed part of the vapour flow is discharged from the upper part of the space through outlets 23, 24.

When as heat sources such vapours are used which, in addition to water vapour, contain non-condensable gases, e.g. air, and compounds, e.g. methanol which condenses at a lower temperature than water vapour, the vapour flow has to be cooled to enable the greatest possible proportion thereof to be condensed. On the other hand it is aimed to prevent e.g. methanol from being condensed and to obtain a cleanest possible condensate in which case it is not necessary to purify it separately, e.g. by stripping.

In the evaporator according to the invention the first tube pass in the tube bundle 4, 5 condenses the main part of the vapour flow. The vapour flowing upwards against the condensate flow heats the condensate which flows downwards and vaporizes (strips) e.g. methanol condensed therein. Thus, the condensate of the first flow-through is obtained "clean" from the evaporator.

The second tube pass in the tube bundle 4, 5 cools and condenses the rest of the vapour flow. In the second tube pass, e.g. the condensable methanol is mixed with the condensate of the second tube pass and is obtained from the evaporator together with "foul" condensate.

How great part of the tube bundle 4, 5 the second tube pass forms depends mainly on the content of other condensable components, e.g. methanol, and the content of the non-condensable components, e.g. air, in the vapour flow.

The liquid to be vaporized is led to the upper part of the evaporator through an inlet pipe 25 and is distributed through liquid distribution devices 10, 11 to flow down along the outer surface of the vertical tubes 6 as an even liquid layer. A part of the liquid is vaporized on the heat transfer surface, and the generated vapour is conducted through the vapour space 26 between the tube bundles 4, 5 to the lower part of the evaporator, wherefrom it is conducted through a droplet separator 14 to a vapour collecting chamber 15 and further out through an outlet 28.

In addition to be supported by tube plates 7, 8 and collecting manifolds 9, the vertical tubes 6 of the tube bundles 4, 5 are also supported from the outside at predetermined distances. Supporting structures 27 are intended to facilitate assembling of the device, to support the vertical tubes 6 and the tube bundles 4, 5 during transport and to prevent detrimental vibration and breakage of the vertical tubes 6 in use.

The unevaporated portion of the liquid flow flows downwards along the inclined tube plate 7, 8 and falls down to a liquid space 16 of the lower part, wherefrom it is discharged through an outlet 29. Both tube bundles 4, 5 and possible partial tube bundles may have their own liquid circulations, whereby, for instance, when concentrating a liquid, the liquid circulations may have different concentrations. The different concentrations are kept apart from each other by dividing the liquid space 16 of the lower part by partition walls into required compartments, whereby the vapour space is common to all parts.

It is possible to arrange partition walls also in the vapour space between the tube bundles 4, 5 to form separated vapour spaces. Due to this it is possible to arrange, for instance, two evaporation stages in the same evaporator.

The invention claimed is:

1. A falling film evaporator, comprising:
an outer shell formed by a cylindrical shell and convex ends;
two or more tube bundles each formed of vertical tubes disposed inside the outer shell, each of the respective tube bundles having a tube plate and being attached to a corresponding plurality of collecting pipes, the vertical tubes of each respective tube bundle having lower ends attached to the tube plate of the respective tube bundle and upper ends attached to the plurality of collecting pipes of the respective tube bundle, the vertical tubes being configured to receive a heat-releasing, condensable vapor fed upwards through the vertical tubes from below the vertical tubes, the tube bundles being configured to receive a heat-receiving, vaporizable liquid fed to the upper end of said tube bundle to fall downwards along the outer surface of the vertical tubes as a thin liquid layer; and
a discharger configured to discharge uncondensed components contained in the heat-releasing vapor disposed in connection with the tube bundle,
wherein the tube bundles are unconnected to the shell at the upper ends thereof.

2. The falling film evaporator according to claim 1, wherein the tube plate or plates are inclined relative to the horizontal.

3. The falling film evaporator according to claim 2, wherein a bend is formed in the lower end of the vertical tubes to allow the tubes to end in the tube plate perpendicularly.

4. The falling film evaporator according to claim 1, wherein the vertical tubes of each tube bundle are supported by support structures at least at one point between the ends of the tubes.

5. The falling film evaporator according to claim 1, wherein the vertical tubes of the tube bundle are made of metal or a thin plastic material.

6. The falling film evaporator according to claim 1, wherein an individual tube bundle is divided into partial tube bundles.

7. The falling film evaporator according to claim 1, further comprising:
a vapor inlet chamber underneath a respective one of the tube plates for the respective tube bundle,
wherein each of the vertical tubes of the respective tube bundles have a lower end ending in a respective separation space separated from the vapor inlet chamber.

8. The falling film evaporator according to claim 7, further comprising an opening disposed in the upper end of the vertical tubes in which the vapor flows upwards, the opening being configured to be throttled.

9. The falling film evaporator according to claim 1, wherein a vapor space between the tube bundles is divided by a separating wall.

10. The falling film evaporator according to claim 1, wherein the tubes are circular in cross-section.

11. The falling film evaporator according to claim 1, further comprising an outlet configured to discharge evaporated vapor, the outlet being in connection with a vapor collecting chamber provided with a droplet separator and positioned in the lower part of the evaporator.

12. The falling film evaporator according to claim 11, wherein the tube plate or plates are inclined relative to the horizontal.

13. The falling film evaporator according to claim 11, wherein the vertical tubes of each tube bundle are supported by support structures at least at one point between the ends of the tubes.

14. The falling film evaporator according to claim 11, wherein an individual tube bundle is divided into partial tube bundles.

15. The falling film evaporator according to claim 11, further comprising
a vapor inlet chamber underneath each of the tube plates for the corresponding tube bundle,
wherein each of the vertical tubes of the respective tube bundles have a lower end ending in a respective separation space separated from the vapor inlet chamber.

* * * * *